June 21, 1949. W. H. VINING 2,474,021
PRODUCTION OF METAL COMPOUNDS
Filed Jan. 17, 1948
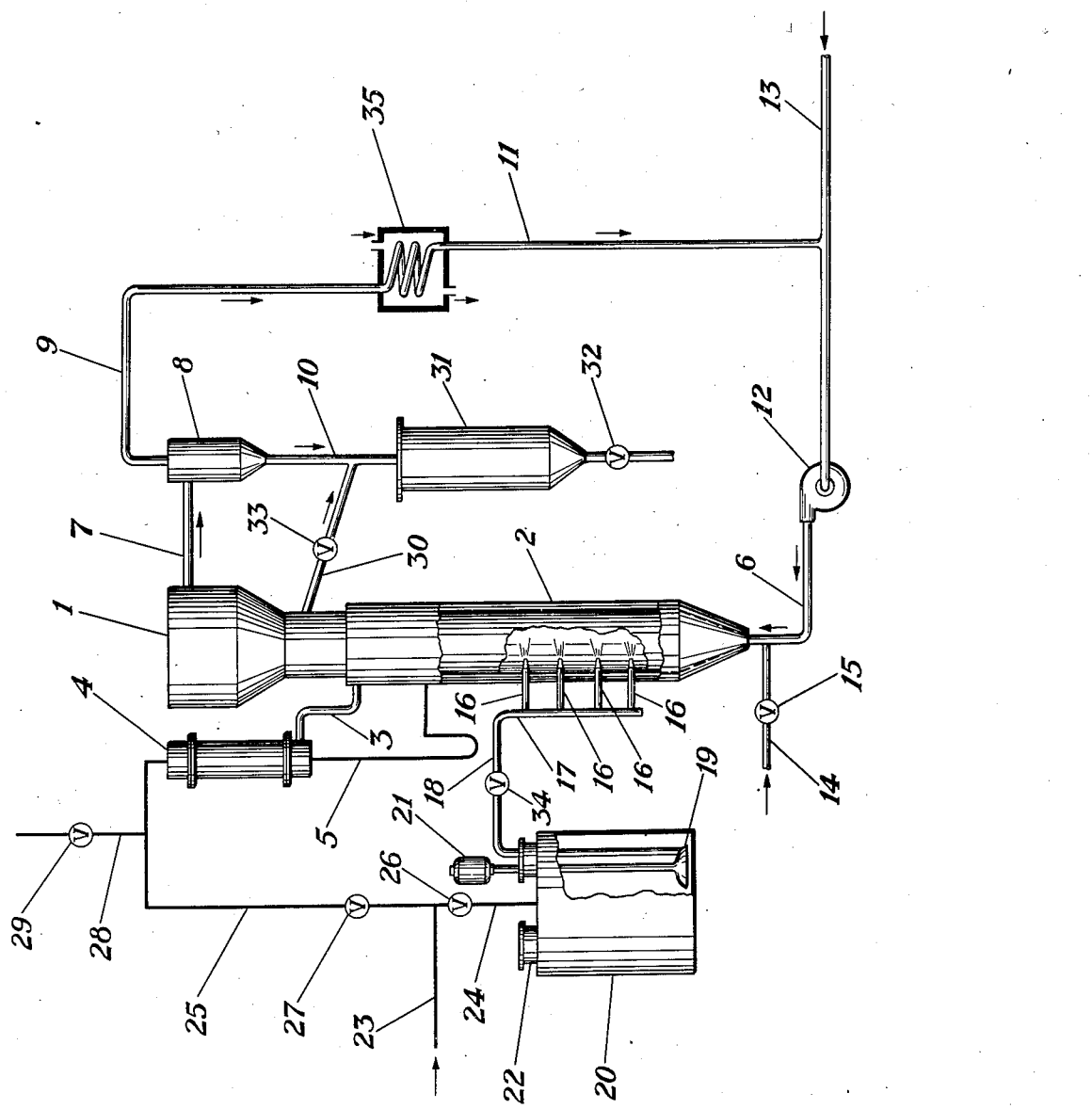
INVENTOR.
WILLIAM H. VINING
BY
ATTORNEY Patented June 21, 1949

2,474,021

UNITED STATES PATENT OFFICE 2,474,021

PRODUCTION OF METAL COMPOUNDS

William H. Vining, Niagara Falls, N. Y., assignor to E. I. du Pont de Nemours & Company, Wilmington, Del., a corporation of Delaware Application January 17, 1948, Serial No. 2,832

8 Claims. (Cl. 23—184)

This invention relates to the production of solid alkali metal compounds and more particularly to the manufacture of such compounds by reacting a molten alkali metal with a gaseous reactant.

Heretofore alkali metal compounds such as sodium monoxide, sodium peroxide and sodium hydride have been produced by reacting molten sodium with oxygen or hydrogen respectively. In carrying out such reactions the most efficient procedure has consisted in placing in a rotatable cylindrical reactor a quantity of the solid product, for example, sodium monoxide, heated to a temperature above the melting point of sodium, adding a quantity of sodium and thereafter passing through air or oxygen while rotating the reactor. In this process the added sodium becomes distributed over the surface of the granules or particles of the solid monoxide and the film of sodium on each particle is utilized. In like manner, sodium hydride can be made whereby molten sodium is distributed on particles of sodium hydride and reacted with hydrogen. When the reaction is concluded, part of the product may be removed and the process repeated.

Such processes are described in Carveth, U. S. Patents 1,685,520 and 1,796,241 and Freudenberg, U. S. Patent 1,796,265.

While the above methods have been satisfactory for commercial operation, they are, nevertheless, batch operations and at the end of each operation, the reactor must be cooled, product removed and the process continued. In the sodium peroxide process described in the above mentioned Carveth patents cooling must be applied during the monoxide step and heat applied in the final stage wherein monoxide is converted to the peroxide. Hence, two different reactors must be provided and product removed from the monoxide reactor must be stored in closed containers and later charged into the second reactor. This material is hazardous to handle, and the operations involved make it difficult to avoid introduction of impurities. Also, it is difficult so to operate without bringing some air into contact with the product, which is generally undesirable and contributes to formation of impurities. The intermittent charging of alkali metal into the reactor also introduces hazards and contributes to the expense of the process.

It has long been desired to carry out such processes in a substantially continuous manner and to utilize a reaction system whereby alkali metal and reactant gas can be introduced into a permanently closed reactor and cooled product withdrawn without cooling the reactor contents. Heretofore various proposals for such continuous operation have not proved satisfactory.

An object of the present invention is an improved process for the production of solid alkali metal compounds by reacting molten alkali metals with gaseous reactants. A further object is to provide improved methods for producing alkali metal oxides and hydrides, particularly sodium monoxide, sodium peroxide and sodium hydride. A further object is to carry out the aforesaid reactions in a continuous or semi-continuous manner and is a closed system. Still other objects will be apparent from the following description of the invention.

In accordance with the present invention, the above objects are obtained by fluidizing a quantity of the desired solid alkali metal product in the gaseous reactant and adding molten alkali metal to the fluidized mass. For example, a quantity of solid finely divided sodium hydride may be dispersed in an upflowing steam of hydrogen, the velocity of which is just sufficient to maintain the bulk of the hydride in the form of a solid-in-gas dispersion commonly known as a "fluidized" condition, the gas velocity being insufficient to carry out of said mass any substantial quantity of the solid material, and introducing molten sodium, preferably in a finely divided state, into the dispersed or fluidized mass of hydride. Under these conditions it has been discovered that the molten metal becomes dispersed substantially uniformly over the surface of the fluidized solid particles, forming a film which rapidly reacts with the hydrogen present, thus continuously increasing the amount of solid material in the dispersed or fluidized condition. By providing means for outflow of solid material from the reactor, the sodium hydride may be continuously removed. In like manner, sodium and other alkali metals may be reacted with other gaseous reactants, for example, with oxygen to make alkali metal oxides.

The preferred mode of operating this invention will be described with reference to the appended drawing which diagrammatically illustrates a reaction system consisting of a reactor and auxiliary equipment. The apparatus utilized consists of a vertical cylindrical reactor 1, which has a large upper section and a conical section at the lower end and is surrounded, except for a portion near the upper end, by heat exchange jacket 2. The heat exchange jacket 2 is provided with a vapor outlet 3 leading to a water cooled condenser 4. Pipe 5 serves to lead condensate from condenser 4 back into jacket 2. The reactor 1 is provided at its lower end with a gas inlet pipe 6 and, at the upper end with gas outlet pipe 7. The latter leads into a conventional cyclone separator 8 which is provided with gas outlet pipe 9 and solids outlet pipe 10. The gas outlet pipe 9 passes through a gas cooler 35 and from thence via line 11 to a conventional gas blower 12. Line 13 which is connected with pipe 11 and gas blower 12 leads to a source of supply of reactant gas. Pipe 14 fitted with valve 15 is provided to lead catalytic materials into pipe 6 and thence into the reactor.

Reactor 1 is provided at a point between the upper end of jacket 2 and the enlarged portion of the reactor with a solids outlet pipe 30 provided with valve 33. Pipe 30 opens into the top of the closed receiver 31, which is provided with outlet valve 32. Pipe 10 from the cyclone separator 8 is likewise connected with the receiver 31 so as to lead solids from the separator into the receiver.

The reactor 1 is also provided with a plurality of molten metal inlets 16 adapted to lead molten metal into the reactor. Preferably inlets 16 terminate in spray nozzles. Inlets 16 are connected to a manifold 17, which in turn is connected by means of pipe 18 to pump 19. Pump 19 is located in the bottom of molten metal storage vessel 20 and is operated by means of motor 21. Line 18 is provided with a control valve 34. The storage vessel 20 is provided with a port 22, adapted for feeding metal ingots, and with heating means not shown.

Pipe 23 leading to a source of inert gas such as nitrogen, argon or helium, is connected by pipe 24 with the top of the vessel 20 and by pipe 25 with the top of condenser 4, these pipes being provided with valves 26 and 27, respectively. Between valve 27 and condenser 4 is provided a vent line 28 provided with valve 29.

In operation, a quantity of finely divided sodium hydride is placed in the reactor and hydrogen flow from pipe 13 is passed upwardly through the reactor by means of blower 12 at a rate just sufficient to maintain the hydride in a dispersed or fluidized condition. Jacket 2 is charged with a conventional heat transfer liquid which has a boiling point at or close to the desired reaction temperature, for example, 360° C. By means of conventional heating means not shown, the heat exchange liquid in 2 is heated substantially to its boiling point, whereby the vapor of said liquid passes through pipe 3 into condenser 4 where it is condensed, the condensate returning to the jacket by way of pipe 5.

The hydrogen passes in at the bottom of the reactor, escapes through pipe 7 and thence through separator 8 and pipes 9 and 11 and is recirculated by the blower. In the beginning of the operation gas cooler 35 may be placed out of operation by withholding cooling fluid, or by bypassing the gas around it by means of pipe connections not shown.

When the temperature within the reactor has thus been raised to a temperature above the melting point of sodium, e. g. 100 to 300° C., pump 19 is operated to feed molten sodium into the reactor. As the reaction proceeds, the quantity of hydride in the reactor increases until the upper level of the fluidized bed of hydride reaches the overflow point and subdivided hydride flows out by gravity through pipe 30 into receiver 31.

The rate of sodium input will determine the character of the product thus continuously escaping through pipe 30. If the sodium input is sufficiently high, this product will contain an appreciable amount of sodium. By decreasing the rate of sodium input, the sodium content of the product can be reduced to as low as 0.001% by weight. When it is desired to produce an absolutely sodium-free product, valve 33 in line 30 is closed and the process is continued until the level of the fluidized hydride rises up to a point above outlet pipe 30. The introduction of sodium is then stopped by stopping pump 19 and the flow of hydrogen is continued, whereby within a few minutes substantially all of the free sodium will have reacted to form hydride. Valve 33 then may be opened to permit hydride to flow into the receiver 31 until the level of the fluidized hydride bed has fallen to the outlet point. Valve 33 is then closed and sodium is again introduced into the reactor.

During the entire operation hydrogen is passed through the reactor by means of blower 12 and hydrogen escaping from the top of the reactor is recycled through cooler 35. Cooler 35, together with condenser 4, serve to remove the heat of reaction and maintain a constant reaction temperature.

While the bulk of the fluidized hydride remains in the reactor, the outflow of hydrogen through pipe 7 generally carries a small amount of hydride particles having a finer state of subdivision. These are removed from the hydrogen stream by means of separator 8 and are collected in receiver 31. From time to time the contents of receiver 31 may be removed through outlet valve 32 into a suitable secondary receiver of conventional design whereby the hydride is cooled and packaged, preferably under an atmosphere of nitrogen.

In a preferred mode of operation a small portion of catalytic material may be added to the reactor by any suitable means, for example, by flowing it through pipe 14 and valve 15 into the incoming stream of hydrogen. A preferred catalyst is acetylene, fed at a rate equivalent to about 0.1 to 2 liters of acetylene (measured at N. T. P.) per lb. of sodium introduced into the reactor.

The function of the nitrogen introduced through pipe 23 is to maintain an oxygen-free atmosphere over the metallic sodium in vessel 20 and over the liquid in condenser 4 to avoid any damage to these materials through oxidation. Preferably a continuous flow of nitrogen is maintained under slightly more than atmospheric pressure, so that a stream of nitrogen passes out through vent pipe 28.

The apparatus is provided with various conventional heating means not shown in the drawing for maintaining the sodium in the liquid state and also with conventional means for feeding alkali metal continuously or at intervals into storage vessel 20.

The above described process may be utilized for making alkali metal oxides by utilizing oxygen, air or other oxygen-containing gas, in place of the hydrogen. In the production of alkali metal oxides by this method, the gaseous reactant may be air, air containing additional oxygen, mixtures of inert gas such as nitrogen, containing various amounts of oxygen, e. g. as low as 1% by volume, or other oxygen-containing gases.

In another mode of practicing the invention, two or more reactors like that illustrated by the drawing may be connected in tandem to produce substantially metal-free product by continuous operation. In accordance with this method, product continuously escaping from the first reactor and containing a small amount of unreacted metal is passed into the second reactor preferably by permitting it to flow into the inflowing stream of gas passed into the second reactor. Finished product substantially free from unreacted metal then continuously overflows from the second reactor from an outlet pipe such as pipe 30 and thence to a suitable receiver. In making sodium peroxide by means of such a pair of reactors, the product from the first reactor may consist predominately of sodium monoxide containing a small amount of unreacted metal or of sodium peroxide containing a small amount of monoxide. In the second reactor this product will be reacted with oxygen or an oxygen-containing gas and at a somewhat higher temperature, whereby the product from the second reactor is substantially pure sodium peroxide. If desired, instead of two reactors thus arranged in series, a plurality of three or more reactors may be arranged whereby the product is increasingly hydrogenated or oxidized, as the case may be, while passing through the series of reactors.

The rates of flow of the alkali metal into the reactor will vary over a considerable range, depending upon the nature or purity of the product desired to be produced in that reactor and other factors, such as the reaction temperature employed. Care must be taken not to add the metal too rapidly as this may cause the formation of a liquid solution of the hydride or oxide in molten metal which results in more or less agglomeration of the solid particles in the reactor, thus interfering with proper gas fluidation of the solid.

The maximum rate of metal input without formation of such liquid solution to an undesirable extent therefore depends on the melting point property of mixtures of the metal and the product and on the rate of reaction, and hence on the temperature in the reactor. This condition is partially counterbalanced by the fact that the rate of reaction is proportional to the temperature, i. e. increases with increase in temperature.

In practice, at a sufficiently high reaction temperature, the metal may be flowed in at a rapid rate and will be found to react substantially as fast as added.

The reaction temperature may vary over a wide range and is not essentially different from that employed in carrying out the same reaction in the conventional manner. In making sodium hydride by this method, a temperature within the range of 300 to 400° C. is preferred. At lower temperatures the reaction is relatively slow and at higher temperatures the hydride tends to decompose.

The invention is not restricted to the particular mode of operation described above, as various other methods of practicing this disclosure will be apparent to those skilled in conducting chemical processes. For example, the molten metal may be flowed in at the top of the reactor in one or more streams or as a spray, in addition to, or instead of, the mode of introduction disclosed above. Thus, the metal may be introduced at any point within the bed of fluidized solid or above said bed. Also, if desired, the metal may be added in the solid state, for example, by dropping piece in at the top of the reactor. Unless such pieces are unduly large, they will melt and react before reaching the bottom of the fluidized bed. Any metal passing through the bottom of the bed will be swept back in by the inflowing gas stream. If desired, the metal may be added as liquid or as a subdivided solid to the incoming gas stream.

Various means may be employed for removing the solid product from the reactor, in addition to the means shown above. For example, an outlet may be provided in the lower part of the reactor, or a stand pipe may be provided, extending through the bottom of the reactor.

The reactor may be provided with a foraminous plate or other conventional gas distributor at the bottom. It may also be provided with one or more baffles of conventional design. One form of suitable baffles may consist of horizontal wire or expanded metal screens, spaced one reaction diameter or more apart.

The particle size of the fluidized solid may vary over a wide range, e. g. 200 mesh to 20 mesh, as will be apparent to those acquainted with the art of fluidizing solids in gas streams.

Likewise, the invention is not restricted to the manufacture of sodium hydride and sodium oxides but similarly can be used to produce the hydrides, monoxides and peroxides of other alkali metals, that is, of potassium, lithium, rubidium and cesium. The invention also may be utilized to carry out other reactions between the alkali metals and gaseous reactants to produce solid products, limited only to the production of solid products which do not melt or become tacky at temperatures below the melting point of the alkali metal utilized or below the minimum required reaction temperature, whichever is higher. Examples of such other alkali metal products are the alkali metal acetylides, carbides, alcoholates and the like.

This invention also may be utilized to produce the products of reactions between gaseous reactants and other relatively low melting metals. Examples of such products are: tin oxide, lead oxides, calcium hydride, magnesium hydride and the hydrides, nitrides and oxides of other alkaline earth metals.

This invention provides a convenient and useful method for producing alkali metal oxides, hydrides and other alkali metal compounds by reacting molten alkali metal with gaseous reactants. A prime advantage of the process is that it permits substantially continuous operation and permits operation within an entirely closed system. It avoids the necessity of opening the reactor to introduce metal and thus avoids contact of air with the reactants and products. This results in greater purity of product and substantially decreases hazards of operation. Likewise, when it is necessary to carry such reactions through a series of operations under different conditions, for example, in the manufacture of sodium peroxide which is first oxidized to the monoxide and thereafter to the peroxide, this invention eliminates prior operations such as discharging the monoxide from the first reactor, storage of this intermediate product and then charging it into the peroxide reactor. The present invention permits entire reaction to be carried out substantially in a continuous manner, in a single closed system.

I claim:

1. The process for production of sodium hydride which comprises passing a stream of hydrogen upwardly through a mass of finely divided sodium hydride at a velocity sufficient to create and maintain a solid-in-gas dispersion substantially without transporting said mass in the out-flowing gas stream and introducing molten sodium into said dispersion, while maintaining the temperature of said dispersion between the melting point of sodium and the decomposition point of said hydride.

2. The process for production of sodium hydride which comprises passing a stream of hydrogen upwardly through a mass of finely divided sodium hydride at a velocity sufficient to create and maintain a solid-in-gas dispersion substantially without transporting said mass in the out-flowing gas stream and introducing molten sodium into said dispersion, while maintaining the temperature of said dispersion at about 300 to 400° C.

3. The process for production of an alkali metal hydride which comprises passing a stream of hydrogen upwardly through a mass of finely divided alkali metal hydride at a velocity sufficient to create and maintain a solid-in-gas dispersion substantially without transporting said mass in the out-flowing gas stream and introducing molten alkali metal into said dispersion, while maintaining the temperature of said dispersion between the melting point of the alkali metal and the decomposition point of said hydride.

4. A process for reacting a molten metal with a gaseous reactant to produce a product solid at reaction temperature, which comprises fluidizing a mass of said product in subdivided form in an up-flowing stream of said gaseous reactant and introducing said molten metal into the fluidized mass at a temperature above the melting point of said metal.

5. A process for reacting molten alkali metal with a gaseous reactant to form a solid reaction product which comprises fluidizing said product in subdivided form in an up-flowing stream of said gaseous reactant at a temperature above the melting point of said metal and introducing said metal into the resulting bed of fluidized product.

6. The process which comprises fluidizing an alkali metal oxide in subdivided form in an up-flowing stream of an oxygen-containing gas and introducing molten alkali metal into the resulting bed of fluidized oxide at a temperature above the melting point of said metal.

7. A continuous process for the production of an alkali metal peroxide which comprises fluidizing a mass of an alkali metal oxide in an upwardly flowing stream of an oxygen-containing gas, continuously introducing molten alkali metal into the resulting fluidized mass, continuously removing said alkali metal oxide from said fluidized mass and fluidizing it in another location in an up-flowing stream of oxygen-containing gas.

8. A continuous process for the production of an alkali metal peroxide which comprises simultaneously fluidizing separate masses of subdivided alkali metal oxide in a plurality of up-flowing streams of oxygen-containing gas, continuously introducing molten alkali metal to the point of the so fluidized masses, continuously withdrawing oxide from each of said fluidized masses, and, except for the last of said fluidized masses, introducing the withdrawn oxide into the next fluidized mass.

WILLIAM H. VINING.

REFERENCES CITED

The following references are of record in the file of this patent:

UNITED STATES PATENTS

| Number | Name | Date |
|---|---|---|
| Re. 21,526 | Odell | Aug. 6, 1940 |

Certificate of Correction

Patent No. 2,474,021.

June 21, 1949.

WILLIAM H. VINING

It is hereby certified that errors appear in the printed specification of the above numbered patent requiring correction as follows:

Column 2, line 13, for the words "and is" read *and in*; line 22, for "steam" read *stream*; column 5, line 70, for "piece" read *pieces*; and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*